United States Patent [19]
De Vault

[11] 3,715,352
[45] Feb. 6, 1973

[54] 2-BENZYL-1,4-DIMETHYL-5-HYDROXYMETHYL-2,5-EPIDITHIAPIPERAZINE-3,6-DIONE AND 2-BENZYL-1,4-DIMETHYL-5-HYDROXYMETHYL-2,5-EPITRITHIAPIPERAZINE-3,6-DIONE USEFUL AS ANTI-FUNGAL AGENTS

[75] Inventor: Robert Larry De Vault, Libertyville, Ill.

[73] Assignee: Abbott Laboratories, Chicago, Ill.

[22] Filed: Dec. 21, 1970

[21] Appl. No.: 100,438

[52] U.S. Cl. ........260/243 R, 260/268 DK, 424/246, 424/250
[51] Int. Cl. ..................C07d 93/06, C07d 93/36
[58] Field of Search.........260/243 R, 327 R, 268 DK

[56] References Cited

UNITED STATES PATENTS

| | | | |
|---|---|---|---|
| 3,560,483 | 2/1971 | Svokos et al. | 260/243 |
| 3,562,253 | 2/1971 | Trown | 260/243 |

Primary Examiner—John M. Ford
Attorney—Robert L. Niblack

[57] ABSTRACT

2-Benzyl-1,4-dimethyl-5-hydroxymethyl-2,5-epidithiapiperazine-3,6-dione and 2-benzyl-1,4-dimethyl-5-hydroxymethyl-2,5-epitrithiapiperazine-3,6-dione useful as antifungal agents.

3 Claims, No Drawings

2-BENZYL-1,4-DIMETHYL-5-HYDROXYMETHYL-2,5-EPIDITHIAPIPERAZINE-3,6-DIONE AND 2-BENZYL-1,4-DIMETHYL-5-HYDROXYMETHYL-2,5-EPITRITHIAPIPERAZINE-3,6-DIONE USEFUL AS ANTI-FUNGAL AGENTS

DESCRIPTION OF INVENTION

This invention relates to novel compositions of matter having anti-fungal activity, and especially to compounds having activity against that class of fungi known as dermatophytes, members of which are often responsible for causing irritating and unsightly leisions. More particularly, this invention relates to novel compositions of matter and to processes for their preparation by fermentation means, together with procedures for the isolation and recovery of these compositions from fermentation beer.

It is the primary object of this invention to provide new and useful topical anti-fungal agents that have a broad spectrum of activity against those fungi commonly found on skin surfaces including achorion, microsporum, epidermophyton, trichophyton and similar species. An additional object of this invention is to provide a process for the preparation and recovery of said agent.

It has now been found that cultivation of a non-sporulating mold similar to the genus Torula under the controlled conditions hereinafter set forth produces novel compositions of matter identified as having the following structural formula:

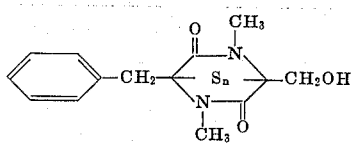

wherein the subscript $n$ is the integer 2 or 3. A sample of the Torula species is on deposit with the Culture Collection Unit of the Northern Utilization Research and Development Division, United States Department of Agriculture, Peoria, Ill., and can therefrom be obtained under the code number NRRL 3888. The compounds identified by the above formula are produced by the growth of NRRL 3888 under controlled conditions which include growth within a temperature range of 20°–45°C, and preferably 25°–40°C under conditions of submerged fermentation with agitation and aeration by suitable means sufficient for growth, using a media comprising an assimilable carbohydrate energy source such as a disaccharide or monosaccharide preferably such as lactose or glucose; for example, a source of organic nitrogen such as soybean meal, corn steep liquor or peptone; and a trace source of magnesium and zinc ions such as obtained from magnesium and zinc sulfate or other inorganic salts of magnesium and zinc. To obtain improved yields, it has been found advisable to provide an insoluble buffering agent that prevents the accumulation of acid, resulting in a lowered pH which would in turn inhibit the growth of the organism if such accumulation were allowed to continue during the course of the fermentation. Such a buffering agent as calcium carbonate or magnesium carbonate can be employed with good results.

The relative quantities of the nutrients in the growth media affect the yield of the compounds of this invention insofar as the exhaustion of any one nutrient will end further growth of the organism, hence further production of the desired compounds. For maximum growth, a balanced media is desired in which 25 – 45 parts by weight of carbohydrate, 40 – 60 parts by weight of an organic nitrogen source, 1 – 4 parts by weight of a buffer together with trace quantities $Zn^{++}$ and $Mg^{++}$ per liter of water.

The duration of the fermentation is, of course, a function of the nitrient supply and the temperature at which the fermentation is conducted. For those fermentations conducted within the range of 25° to 40°C., it has been found that the fermentation is completed within 75 to 150 hours. When the growth of the organism has produced a satisfactory amount of the anti-fungal agent, a filtrate from the whole culture or alternatively the whole culture itself is processed to recover the active components. After the fermentation is complete, the whole culture after filtration of pressing is extracted with water immiscible solvent such as ethyl acetate or amyl acetate. The extract is then concentrated and the solvent phase removed at reduced pressure, the compounds of this invention being isolated therefrom as an oily residue.

Alternatively, after the fermentation is complete, the whole culture can be macerated to break up or finely divide the mycelium. After steeping the whole culture with an aqueous solution of a water miscible organic solvent such as a lower alcohol or ketone, e.g., methanol, ethanol, and acetone, the whole culture is filtered. If desired, the filter cake can further be digested with additional aqueous solution of water miscible solvent, then again filtered and the filtrates combined. These filtrates are extracted with a water immiscible solvent, such as ethyl acetate or amyl acetate and the extracts concentrated as before. Although the anti-fungal agents of this invention identified in the above formula have not been found to crystallize, they can be purified by successive solvation and extraction, or other known means for purifying non-crystalline materials.

The following example will more clearly illustrate the formation, recovery, concentration, purification and identification of the anti-fungal agents of this invention, but such example is not intended to limit the invention to the precise techniques employed therein.

PREPARATION OF INOCULUM

Inoculum for the fermentation was prepared by adding 15 g. of soya bean flour, 5 g. of glucose, and 1 g. of calcium carbonate per 1 liter of deionized water. Flasks were inoculated with NRRL 3888 and grown for 96 hours at 28°C. on a rotary shaker.

FERMENTATION

The inoculum was then added to 30 liter tanks containing 12 liters of a media prepared by adding 50 g. corn steep liquor; 30 g. lactose; 5 g. glucose; 0.5 g. potassium dihydrogen phosphate, $KH_2PO_4$; 3 g. sodium nitrate, $NaNO_3$; 40 mg. zinc sulfate, $ZnSO_4 \cdot 7H_2O$; 3 g. calcium carbonate, $CaCO_3$; and 0.25 g. magnesium sulfate, $Mg SO_4 \cdot 7H_2O$ per liter of deionized water. During fermentation at 28°C. for 96 hours, the fermentors were treated with 1 volume of air per volume of media per minute with agitation.

EXTRACTION

After completion of growth period, the filtered beer was extracted with one volume of ethyl acetate for each four volumes of filtrate and the ethyl acetate fraction evaporated to dryness in vacuo.

ISOLATION

The oily residue was resuspended in ethyl acetate and chromatographed on a silica gel (Merck 70-325 mesh) column (50 × 3 cm ). The compound 2-benzyl-1,4-dimethyl-5-hydroxymethyl-2,5-epidithiapiperazine-3,6-dione was located in the effluent by thin layer chromatography on silica gel plates developed in ethyl acetate. It was also located by assay against *B. Subtilus* using an agar dilution method.

2-benzyl-1,4-dimethyl-5-hydroxymethyl-2,5-epidithiapiperazine-3,6-dione was obtained as a yellow oil upon concentration of the fractions from the silica gel column which contained the spot at $R_f$ 0.74 on TLC analysis. While soluble in most organic solvents it is insoluble in water. It catalyzes the liberation of nitrogen from sodium azide and iodine, and gives a weak ninhydrin, but strong Ehrlich reaction.

The following micro analytical data were obtained: Calculated for $C_{14}H_{16}N_2O_3S_2$.

| (Cal.) | (%) | Found (%) |
|---|---|---|
| C | 51.83 | 50.22 |
| H | 4.97 | 5.28 |
| N | 8.64 | 7.93 |
| S | 19.77 | 18.33 |

Another compound 2-benzyl-1,4-dimethyl-5-hydroxymethyl-2,5-epitrithiapiperazine-3,6-dione produced by NRRL 3888 although present in the filtered beer, is more highly concentrated in the mycelia. The filtered mycelia cake from the above fermentation was extracted with a 2:1 aqueous methanol solution by agitation for 2 hours. The methanol extract was isolated by filtration and the mycelial cake discarded. Then the methanol extract was concentrated to 500 ml. and extracted with an equal volume of ethyl acetate. The ethyl acetate phase was concentrated to an oil and resuspended in toluene;ethyl acetate (3:1). Chromatography on a silica gel column (2.5 × 50 cm.) as heretofore described yielded a light yellow oil which upon concentration showed the unique $R_f$ which differentiated it from the epidithiapiperazine.

Analytical results are as follows:
Calculated for $C_{14}H_{16}N_2O_3S_3$:

| (Cal.) | (%) | Found (%) |
|---|---|---|
| C | 47.16 | 46.19 |
| H | 4.52 | 5.08 |
| S | 26.98 | 26.03 |
| N | 7.86 | 6.48 |

The biological properties of the epidithiapiperazine and the epitrithiapiperazine are practically indistinguishable in spectrum. However, the epitrithiapiperazine metabolites appear to be slightly less active than the epidithiapiperazine on a weight basis.

The minimum inhibitory concentration of I and II is given in Table II.

TABLE II

| Dermatophytes | The Epidithia-piperazine | The Epitrithia-piperazine |
|---|---|---|
| Canida albicans 10231 | 6.25 | 12.5 |
| Epidermaphyton floccosum Wise | 0.78 | 3.1 |
| Microsporum canis VB | 1.56 | 6.2 |
| Microsporum gypseum 1236 | 6.2 | 25 |
| Trichophyton mentagrophytes 9533 | 0.78 | 6.2 |
| Microsporum audouinii 10216 | 1.56 | 12.5 |
| Trichophyton tonsurans 10217 | 1.56 | 6.2 |
| Trichophyton rubrum Robinson | 6.2 | 12.5 |

The compounds of this invention can be applied topically to an affected area of the skin in a cream, paste, cerate or jelly base prepared in accordance with known pharmaceutical compounding practices. The concentration of the anti-fungal agent in such an ointment should be sufficient to suppress growth of the dermtophyte, or about from one-half of 1 percent to 2 percent by weight.

I claim:

1. A compound having the structure

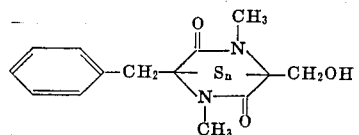

wherein ($n$) is 2 or 3.

2. A compound according to claim 1 in which $n$ is 2, namely 2-benzyl-1,4-dimethyl-5-hydroxymethyl-2,5-epidithiapiperazine-3,6-dione.

3. A compound according to claim 1 in which $n$ is 3, namely 2-benzyl-1,4-dimethyl-5-hydroxymethyl-2,5-epitrithiapiperazine-3,6-dione.

* * * * *